United States Patent [19]
Tobise et al.

[11] Patent Number: 5,748,416
[45] Date of Patent: May 5, 1998

[54] MAGNETORESISTIVE PLAYBACK HEAD

[75] Inventors: Masahiro Tobise, Saitama-ken; Chiharu Mitsumata; Hisayuki Miura, both of Tochigi-ken; Tetsurou Kawai, Saitama-ken, all of Japan; Simon Liao, Santa Barbara, Calif.

[73] Assignees: Hitachi Metals Ltd., Tokyo, Japan; Applied Magnetics Corporation, Goleta, Calif.

[21] Appl. No.: 821,182

[22] Filed: Mar. 19, 1997

[51] Int. Cl.⁶ .................................................. G11B 5/39
[52] U.S. Cl. .................................................. 360/113
[58] Field of Search ...................................... 360/113

[56] References Cited

U.S. PATENT DOCUMENTS 5,408,377  4/1995  Gurney .................................. 360/113

FOREIGN PATENT DOCUMENTS 3-125311  5/1991  Japan .
4-245011  9/1992  Japan .
5-135332  6/1993  Japan .

*Primary Examiner*—A. J. Heinz
*Attorney, Agent, or Firm*—Morrison Law Firm

[57] ABSTRACT

An SAL-type magnetoresistive playback head that is highly sensitive and that limits Barkhausen noise is provided by optimizing the magnetic properties of the permanent magnet film. On top of a lower insulating layer are stacked a soft magnetic bias film (SAL film), a magnetic separating film (shunt film), a magnetoresistive film (MR film), and an upper insulating layer, in that order. The outer sides of the track of the MR film are in direct contact with the permanent magnet film or in indirect contact via a base film. Alternatively, the present invention relates to a spin-valve magnetoresistive playback head. On top of a lower insulating layer are stacked an anti-ferromagnetic film, a fixed magnetizing film, a magnetic separating film, a movable magnetizing film (MR film), and an upper insulating layer, in that order. The outer sides of the track of the movable magnetizing film are in direct contact with the permanent magnet film or in indirect contact via a base film. In either type of playback head, Barkhausen noise is eliminated by using a CoCrPt alloy film having a composition that provides the magnetic properties needed for a permanent magnet film that can handle narrow tracks and narrow gaps, and by specifying a ratio between the thicknesses of the MR film and the permanent magnet film.

26 Claims, 16 Drawing Sheets

PRIOR ART

PRIOR ART

MAGNETORESISTIVE PLAYBACK HEAD

BACKGROUND OF THE INVENTION

The present invention relates to a magnetoresistive playback head (MR head) for reading magnetic data signals from a magnetic recording medium. In particular, the present invention relates a structure for an MR head wherein a permanent magnet film disposed to apply a longitudinal-bias magnetic field can generate adequate coercive force even at a thickness as thin as of approximately 50 Angstroms or less.

The following terms are as defined in S. Handel, *A dictionary of Electronics*, Penguin Books, Middlesex, England, 1972. "Magnetoresistance" is the effect of a magnetic material carrying electric current in the presence of a magnetic field where the material has increased resistivity when the field is parallel to the current flow and decreased resistivity when the field is at right angles to the current flow. "Magnetic flux density" is the amount of magnetic flux per square cm over a small area at a given point. The direction of the flux is at right angles to that area. "Magnetic flux" is the phenomenon produced in the medium surrounding electric currents or magnets. The amount of magnetic flux through any area is measured by the quantity of electricity caused by flow in an electric circuit of a given resistance bounding the area when this circuit is removed from the magnetic field. It is the surface integral of the magnetic flux density or magnetic induction over any surface having the same boundary as the area. The curve showing the ferromagnetic characteristics of a material in which the magnetic flux density, B, is plotted against the magnetic force, H, is called the "magnetization curve." "Retentivity" is the property measured by the residual induction corresponding to the saturation induction for a magnetic material. "Saturation induction" is the maximum intrinsic magnetic induction possible in a material. The ratio of retentivity to saturation flux density is called the "squareness ratio".

The magnetic film of the present invention has a high squareness ratio that serves to eliminate Barkhausen noise, thus making the MR head optimal for applications involving narrow tracks.

An MR head is a dedicated playback head that takes advantage of the magnetoresistive effect of ferromagnetic films to detect signals. In MR heads, the playback properties are independent of the relative speed between the head and the magnetic recording medium such as, for example, a disc. Furthermore, MR heads have high sensitivity. These properties have made MR heads the focus of attention as a playback head that can meet the increasing demand for more compact magnetic disk devices and the increasing demand for heads able to utilize such devices' requisite higher recording densities. Thus, the development of MR heads has been quite active.

A review of MR heads is available in H. Neal Bertram, *The Theory of Magnetic Recording*, Cambridge University Press, Cambridge, England, 1994, pages 166–203, the entirety of which is herein incorporated by reference.

Referring to FIG. 13, there is shown a cross-section perspective drawing of a typical recording/playback head with an incorporated MR head playback head and an inductive recording head. The head is structured with separate playback and recording sections. An MR head 2 is formed on a substrate 7, and then an induction head 1 is mounted to write data onto a magnetic recording medium.

A section XIV of MR head 2 in FIG. 13 is shown enlarged in FIG. 14. Referring to FIG. 14, a stacked stripe 20 comprises a Soft Adjacent Layer ("SAL") film 13 which is a soft-magnetic bias film, a shunt film 12, and an MR (magnetoresistive) film 11. In MR head 2, stacked stripe 20 is disposed between a lower shield layer 52 and a mid-shield layer 51 via a lower insulating layer 42 and an upper insulating layer 41. Furthermore, a permanent magnet film 21 and an electrode film 31 are formed on either side of stacked stripe 20.

Referring to FIG. 14, during playback operations, magnetic data signals on the magnetic recording medium passing by MR head 2 are detected by a playback gap 9 formed by upper insulating layer 41 and lower insulating layer 42. This generates a change in electrical resistance in MR film 11 of stacked stripe 20, which is converted into an electrical signal.

Referring to FIG. 13, during writing operations (i.e. recording), an upper induction head 1 is used, and a magnetic circuit is formed from mid-shield 51 and an upper electrode 3. By sending a signal current through a coil 4, a magnetic field is generated at the recording gap. This results in data being written to the magnetic recording medium, such as a disc.

Referring again to FIG. 14, permanent magnet film 21 and electrode film 31 are disposed on either side of stacked stripe 20, which forms the detector. Stacked stripe 20 is also interposed between upper insulating layer 41 and lower insulating layer 42. Thus, a playback track 10 and playback gap 9 are defined as shown in the drawing. The section between permanent magnet film 21 and electrode film 31 is generally referred to as the playback track region. MR film 11 is formed using thin-film formation technology such as through sputtering a ferromagnetic material. NiFe alloys (permalloys), CoFe alloys, and the like are generally used.

It has previously been disclosed that two bias magnetic fields in different directions are needed for MR heads to perform optimal playback. One of the two bias fields is a transverse bias field for setting the active point of the MR film at a region where the magnetoresistive effect is linear. This results in a linear response to the leakage field from the signal of the magnetic recording medium. The other of the two bias fields is a longitudinal bias field that is generated longitudinally to the MR film. The purpose of this bias field is to apply and set a magnetic field in one direction of the MR film, thus providing smooth rotation of magnetization and limiting discontinuous rotation of magnetization. Another benefit of the longitudinal bias field is that Barkhausen noise is limited by keeping fixed the magnetic zones which tend to be generated at the ends of the MR film.

Referring to FIG. 14, there is shown an example of a SAL bias, which is one method for generating a transverse bias field. In this method, a soft magnetic film is disposed near MR film 11. A sensing current is applied to the MR film, and the resulting magnetic field magnetizes SAL film 13. The magnetic field from the magnetized SAL film results in a bias field at the MR film. This transverse bias field is substantially perpendicular to the surface of the magnetic medium and is substantially parallel to the thickness of the MR film.

The other bias field is generated longitudinally to the MR film. In order to provide this longitudinal bias field, a hard-bias MR head was developed, whereby permanent magnets are disposed on either end of the MR film.

The use of a permanent magnet film to limit Barkhausen noise has been disclosed in the past, such as in Japanese Laid-Open Publication Number 5-135332, the entirety of which is incorporated herein by reference. Referring to FIG. 14, permanent magnet films 21 are disposed on both sides of stacked stripe 20. In this method, permanent magnet films 21 are formed on top of MR film 11. This geometry creates an overlap of the permanent magnet film and the MR film at the ends of the magnetic sensing region, resulting in thicker ends and limiting the ability to narrow the playback gap. In the disclosed invention of 5-135332, the length of the magnetic sensing region is 10 microns or more. Thus, the technology of 5-135332 cannot be applied to a MR head for narrow playback tracks because such narrow playback tracks have widths of 3 microns or less.

In the disclosed invention of 5-135332, the use of an alloy such as CoPt or CoCrPt was suggested for the magnetic disk medium, but there was no disclosure at all of the magnetic properties that are required for the bias film of the MR head to function properly with the permanent magnetic film. Furthermore, there was no disclosure of the specific alloy compositions needed for the bias film of the MR head in order to perform its function properly.

Japanese Laid-Open Publication Number 4-245011, incorporated herein by reference in its entirety, disclosed a similar method for generating a bias field using a permanent magnet film. As in the known example of 5-135332 above, this disclosure involves a structure in which a permanent magnet film is stacked on an MR film. In 4-245011, it is disclosed that Co:80, Pt:20 (atom %) with a thickness of 1000 Angstroms would be desirable, and that a thicker film will provide a stabilized magnetic zone even if an alloy composition with a low residual flux density is used. It is also stated that this composition was chosen simply because a high coercive force was obtained.

The new multimedia focus of the information age has driven a great need for higher-capacity and higher-performance storage means. Consequently, the areal density (bits of data per square inch) required is being driven up. However, as the areal density increases, the signal segments necessarily get smaller which leads to weaker signals registered by playback heads. The weakening of the signal can be compensated by spinning the storage medium faster to strengthen the signal. However, spinning the medium faster leads to increased data frequencies that inductive heads cannot respond to.

The playback MR head has been effective to read current modest areal densities. Currently, MR heads with playback gap lengths of approximately 0.4 microns are used for surface recording densities of 650 Mb/in$^2$. However, as the tendencies toward higher recording densities continue, this playback gap length will become narrower and narrower. The thickness of the permanent magnet film must be decreased as the playback gap length decreases. However, in both of the conventional technologies described above, no reference is made to the important issues relating to playback gap lengths of 0.4 microns and less.

Through the detailed investigation and research of the present inventors, it was discovered that the current approach of simply using a high coercive force for the permanent magnet film does not provide adequate suppression of Barkhausen noise. Consequently, the MR head of the present invention uses a different structure from the prior art described above. The present invention uses permanent magnet films bonded at the ends of the MR film, as disclosed in Japanese laid-open publication number 3-125311, the entirety of which is incorporated herein by reference. The geometry of the permanent magnet film at the ends of the MR film in this type of structure is believed to be suited for heads with narrow playback gaps. Importantly however, none of the prior art technologies discloses the optimal structure for MR heads that is allowed by using permanent magnet films as disclosed in the present application. The prior art does not describe or suggest such vital issues as the specific geometric and alloy chemistry means, provided by the present invention, for restricting Barkhausen noise in SAL-type magnetoresistive heads for use with narrow playback tracks and playback gaps.

Further increases in sensitivity are also currently being sought through MR heads using spin-valve elements, which take advantage of the recently discovered giant magnetoresistive effect. Referring to FIG. 15, there is shown one example of this technology. As presented in IEEE Trans., vol. 31 pp. 2612–1614, incorporated herein in its entirety, the hard-bias method using a permanent magnet film is also effective against Barkhausen noise for spin-valve elements as well. In this article, a CoCrPt alloy film with a residual flux density of $B_r$=5500 G and a coercive force of $H_c$=1000 Oe was used.

The present invention described below has a similar magnitude for coercive force, but the residual flux density is in a completely different range, and there is no description of the specific composition of the CoCrPt of the present invention. Further, the article specifically states that with CoCrPt films of 200 Angstroms or less, the bias field is not adequate for limiting Barkhausen noise. According to the known technology presented in the article, there is no indication or suggestion of how to restrict Barkhausen noise when the CoCrPt film is made as thin as required by the new data storage technology.

In order to improve the recording density, it is necessary to increase the linear recording density or to increase the track density. Improving the linear recording density requires an increase in the resolution along the track. This makes it necessary to have a narrower playback gap. However, reducing the playback gap generally decreases the playback output, so it is also necessary to limit this decrease and maintain the sensitivity. Permalloy film with a thickness of approximately 200–250 Angstroms is generally used for the MR film, but the thickness would have to be reduced to 50 Angstroms or less to provide higher densities.

A method that is frequently used for decreasing the playback gap is to make either the upper insulating layer or the lower insulating layer thinner. However, when the permanent magnet film from the prior art technology is used, the electrode film at the ends of the track are necessarily raised up. This makes it easy for an electrical short to occur between the electrode film and the mid-shield layer. In order to avoid this problem, it is necessary to select an appropriately thicker thickness for the permanent magnet film than what signal considerations would call for.

Furthermore, it would be desirable for the bias field itself to be applied only to the MR film. If the permanent magnet film is thick, the magnetic flux can bypass to sections close to the MR film, such as the upper insulating layer. This would disturb the signal flux received from the magnetic recording medium, and could result in noise or in distortions in the output waveform. Therefore, it is necessary to have a structure that applies the magnetic field only to the MR film or spilling over only to a region very close to the MR film, even if the MR film is very thin, thus preventing magnetic field leakage from the permanent magnet film from disturbing the signal field from the magnetic recording medium.

Referring to FIG. 15, the spin-valve MR element involves basically the same issues as the SAL element shown in FIG. 14. A stacked stripe 20' comprises an anti-ferromagnetic film 14, a fixed magnetic film 18, a magnetic separator film 17, and a movable magnetic film (MR film) 11 all disposed above a lower insulating layer 42. This type of element uses the giant magnetoresistive effect, and in this case it would also be desirable to have the bias field from the permanent magnet film be applied only to the MR film (corresponding to the movable magnetic film). In spin-valve elements, it is expected that the thickness of the movable magnetic film would be 50–100 Angstroms or less. Even if the movable magnetic film is formed this thin, it is still necessary to have an adequate magnetic field applied exclusively to the film.

The narrowing of the playback track widths makes the longitudinal length of the MR film shorter, so that permanent magnetic films 21 disposed separately on either side are separated by a smaller interval of space. Consequently, a strong magnetic field is applied to the MR film. This means that using a permanent magnet film having the same residual flux density and film thickness product ($B_r \cdot t$) as is used for conventional wide playback tracks will have difficulty causing the rotation of the magnetization for the MR film. Further, while Barkhausen noise will be limited, the sensitivity will decrease. Thus, it is necessary to minimize the ($B_r \cdot t$) product within a range where Barkhausen noise can be limited without decreasing sensitivity.

Two possible ways to decrease the ($B_r \cdot t$) product are to lower residual flux density $B_r$ or to make film thickness t smaller. However, with a CoCrPt film, which has a low $B_r$, decreasing the thickness of the film severely decreases coercive force $H_c$. What is needed is a permanent magnet film that is thin yet able to apply a bias field of an appropriately high magnitude solely to the MR film. The permanent magnet film must also have a high coercive force. This would result in an MR head structure that provides a narrow gap and allows narrow playback tracks. Barkhausen noise would be limited while output would not be decreased. Specifically, what is needed is a permanent magnet alloy composition that provides a thin film while also providing a ($B_r \cdot t$) product capable of applying an adequate magnetic field and a sufficient coercive force $H_c$.

OBJECTS AND SUMMARY OF THE INVENTION

The object of the present invention is to provide a bias-type MR head using a permanent magnet film to handle narrow recorded tracks and provide a narrow gap so that recording density can be increased. A magnetic head is provided that is highly sensitive and that limits Barkhausen noise by optimizing the magnetic properties of the permanent magnet film.

It is an object of the present invention to provide an SAL-type magnetoresistive head or a spin-valve magnetoresistive head. In a SAL-type magnetoresistive head, the following layers are stacked on a lower insulating layer: a soft magnetic bias film, a magnetic separation film (shunt film), a magnetoresistive film (MR film), and an upper insulating layer. The outer side of the playback track of the MR film is in direct contact with the permanent magnet film or in indirect contact via a base film. In a spin-valve magnetoresistive head, the following layers are stacked on a lower insulating layer: an anti-ferromagnetic film, a fixed magnetic film, a magnetic separating film, a movable magnetic film (MR film), and an upper insulating film. The outer side of the movable magnetic film is in direct contact with the permanent magnet film or in indirect contact via a base film. In both types of MR heads, the permanent magnet film, used to apply the longitudinal bias field for the MR head of the present invention, is formed from a CoCrPt alloy with a composition of: 65–82 atom % Co; 10–15 atom % Cr; and 8–20 atom % Pt. This provides adequate output and limitation of Barkhausen noise even with a playback track width of 3 microns or less and a playback gap length of 0.2 microns or less.

It is an object of the present invention to provide an MR head with the thickness of the permanent magnet film about 0.5–3 times the thickness of the MR film.

It is a further object of the present invention to provide an MR head where the product of the residual flux density and film thickness ($B_r \cdot t$) is about 200–500 Gmicrons.

It is a further object of the present invention to provide an MR head where the residual flux density $B_r$ is about 9000–13000 G, and the coercive force $H_c$ is about 700 Oe or more.

It is a further object of the present invention to provide an MR head where the coercive force squareness ratio $S^*$ is about 0.6 or more, preferably between 0.60–0.85.

It is a further object of the present invention to provide an MR head where, in order to achieve even better magnetic properties, a base film for the permanent magnet film can be formed from Cr, W, or Mo or an alloy thereof with a thickness of approximately 50–200 Angstroms.

It is a still further object of the present invention to provide an MR playback head with a playback gap that is 0.4 microns or less.

It is a still further object of the present invention to provide an MR playback head with a playback gap that is just the thickness of the upper insulating layer, the SAL film, the shunt film, the MR film, and the lower insulating layer.

Briefly stated an SAL-type magnetoresistive playback head that is highly sensitive and that limits Barkhausen noise is provided by optimizing the magnetic properties of the permanent magnet film. On top of a lower insulating layer are stacked a soft magnetic bias film (SAL film), a magnetic separating film (shunt film), a magnetoresistive film (MR film), and an upper insulating layer, in that order. The outer sides of the track of the MR film are in direct contact with the permanent magnet film or in indirect contact via a base film. Alternatively, the present invention relates to a spin-valve magnetoresistive playback head. On top of a lower insulating layer are stacked an anti-ferromagnetic film, a fixed magnetizing film, a magnetic separating film, a movable magnetizing film (MR film), and an upper insulating layer, in that order. The outer sides of the track of the movable magnetizing film are in direct contact with the permanent magnet film or in indirect contact via a base film. In either type of playback head, Barkhausen noise is eliminated by using a CoCrPt alloy film having a composition that provides the magnetic properties needed for a permanent magnet film that can handle narrow tracks and narrow gaps, and by specifying a ratio between the thicknesses of the MR film and the permanent magnet film.

According to an embodiment of the present invention, a magnetoresistive playback head comprises a magnetoresistive film having a first thickness, a shunt film on the magnetoresistive film, the shunt film having a second thickness, a soft magnetic bias film on the shunt film, the shunt film in a sandwich relationship between the magnetoresistive film and the soft magnetic bias film, the soft magnetic bias film having a third thickness, a stacked stripe comprising the magnetoresistive film, the shunt film, and the soft magnetic bias film, the stacked stripe having a transverse direction across the first, second, and third thicknesses, and a longitudinal direction substantially orthogonal to the transverse direction, the stacked stripe having a first end and a second end at the longitudinal direction, a permanent magnet film, an electrode film disposed on the permanent magnet film to form a bilayer stacked in the transverse direction, the stacked stripe is disposed with the bilayer at each of the first and second ends, an upper insulating layer disposed over the stacked stripe and the bilayer at each of the first and second ends, a lower insulating layer disposed under the stacked stripe and the bilayer at each of the first and second ends, a playback track region is formed by the stacked stripe disposed between the bilayer at each of the first and second ends, the SAL film applies a transverse bias magnetic field and the permanent magnet film applies a longitudinal bias magnetic field to the playback track region, the permanent magnetic film has a coercive force squareness ratio of 0.6 or higher, and a composite magnetic field formed from the longitudinal and the transverse bias magnetic fields from the playback track region comprises a coercive force slanted at approximately 45 degrees.

According to another embodiment of the present invention, a magnetoresistive playback head comprises an anti-ferromagnetic film having a first thickness, a fixed magnetizing film having a second thickness, a magnetic separation film having a third thickness, and a movable magnetizing film having a fourth thickness stacked sequentially to form a stacked stripe; the movable magnetizing film is a magnetoresistive film; the stacked stripe having a transverse direction across the first, second, third, and fourth thicknesses, and a longitudinal direction substantially orthogonal to the transverse direction, the stacked stripe having a first end and a second end at the longitudinal direction, a permanent magnet film, an electrode film disposed on the permanent magnet film to form a bilayer stacked in the transverse direction, the stacked stripe is disposed with the bilayer at each of the first and second ends, an upper insulating layer disposed over the stacked stripe and the bilayer at each of the first and second ends, a lower insulating layer disposed under the stacked stripe and the bilayer at each of the first and second ends, a playback track region is formed by the stacked stripe disposed between the bilayer at each of the first and second ends, the permanent magnetic film has a coercive force squareness ratio of 0.6 or higher, and a composite magnetic field formed from a longitudinal and a transverse bias magnetic fields from the playback track region comprises a coercive force slanted at approximately 45 degrees.

According to another embodiment of the present invention, a magnetoresistive playback head comprises a magnetoresistive film having a first thickness, a shunt film on the magnetoresistive film, the shunt film having a second thickness, a soft magnetic bias film on the shunt film, the shunt film in a sandwich relationship between the magnetoresistive film and the soft magnetic bias film, the soft magnetic bias film having a third thickness, a stacked stripe comprises the magnetoresistive film, the shunt film, and the soft magnetic bias film, the stacked stripe having a transverse direction across the first, second, and third thicknesses, and a longitudinal direction substantially orthogonal to the transverse direction, the stacked stripe having a first end and a second end at the longitudinal direction, a permanent magnet film, an electrode film disposed on the permanent magnet film to form a bilayer stacked in the transverse direction, the stacked stripe is disposed with the bilayer at each of the first and second ends, a base film disposed between each of the first and second ends and the bilayer, the base film extending along a surface of the bilayer at each of the first and second ends, an upper insulating layer disposed over the stacked stripe and the bilayer at each of the first and second ends, the upper insulating layer having a fourth thickness, a lower insulating layer disposed under the stacked stripe and the base film extending along the bilayer at each of the first and second ends, the lower insulating layer having a fifth thickness, a playback track region is formed by the stacked stripe disposing between the bilayer, a playback gap consisting of a sum of the first, second, third, fourth, and fifth thicknesses.

According to another embodiment of the present invention, a magnetoresistive playback head comprises an anti-ferromagnetic film having a first thickness, a fixed magnetizing film having a second thickness, a magnetic separation film having a third thickness, and a movable magnetizing film having a fourth thickness stacked sequentially to form a stacked stripe; the movable magnetizing film is a magnetoresistive film; the stacked stripe having a transverse direction across the first, second, third, and fourth thicknesses, and a longitudinal direction substantially orthogonal to the transverse direction, the stacked stripe having a first end and a second end at the longitudinal direction, a permanent magnet film, an electrode film disposed on the permanent magnet film to form a bilayer stacked in the transverse direction, the stacked stripe is disposed with the bilayer at each of the first and second ends, a base film disposed between each of the first and second ends and the bilayer, the base film extending along a surface of the bilayer at each of the first and second ends, an upper insulating layer disposed over the stacked stripe and the bilayer at each of the first and second ends, the upper insulating layer having a fifth thickness, a lower insulating layer disposed under the stacked stripe and the base film extending along the bilayer at each of the first and second ends, the lower insulating layer having a sixth thickness, a playback track region is formed by the stacked stripe disposing between the bilayer, a playback gap consisting of a sum of the first, second, third, fourth, fifth, and sixth thicknesses.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
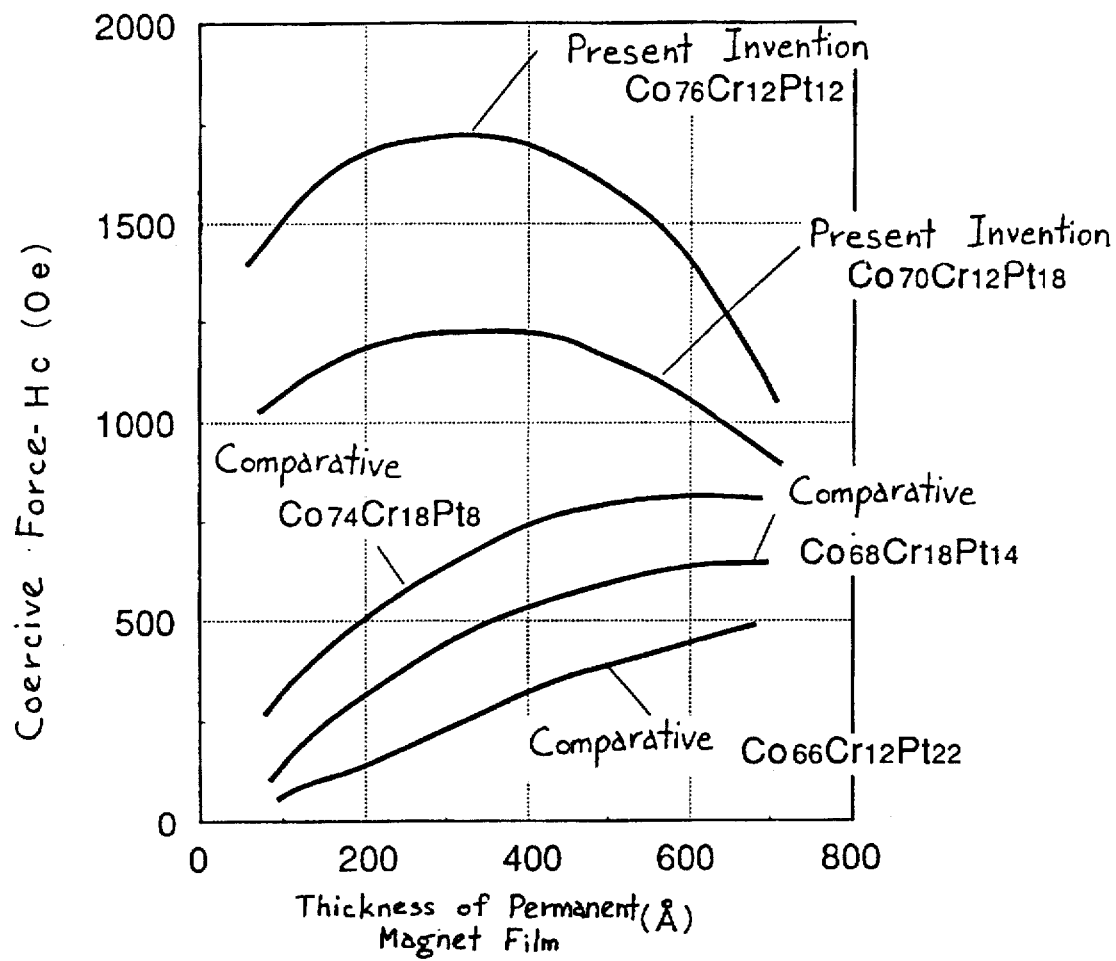
FIG. 1 shows the relationship between the film thickness and the coercive force property in the permanent magnet film of the present invention.

The present invention innovatively provides a structure that specifies the unexpected ratio range between the thicknesses of the permanent magnet film and the MR film, previously unknown, in an MR head wherein the two ends of the stacked stripe are in direct or indirect contact with the permanent magnet film and wherein the playback track width is 3 microns or less and the playback gap length is 0.3 microns or less. The inventors of the present invention began with the prior art disclosed in Japanese laid-open publication number 3-125311 and performed detailed investigations regarding the magnetic properties of the permanent magnet film in order to overcome inherent failings in 3-125311 when the playback track width is made narrower than about 3 microns and when the playback gap length is 0.3 microns or less.

As a result, an unexpected relationship range of the thickness ratio of the MR film to the permanent magnet film that allows narrow gaps and narrow tracks was determined. Furthermore, the magnetic properties of the permanent magnet film that are needed for this application to narrow playback conditions were determined, and a CoCrPt alloy composition was found that could provide these magnetic properties. These serve as the basis for the present invention.

In particular, the present invention is useful in SAL-type magnetoresistive heads or spin-valve magnetoresistive heads where the playback track is 3 microns or less and the playback gap length is 0.2 microns or less. With MR heads that have a track width of about 10 microns, the signal field from the magnetic recording medium is applied more or less only to the MR film even if the MR film is thick or the permanent magnet film on either end is relatively thick. Thus, for the wide playback conditions there is little magnetic field leakage outside the MR film, and the magnetic field from the magnetic recording medium is not disrupted.

However, the strenuous conditions associated with narrower gaps and MR films with relatively very thin thicknesses of 200 Angstroms or less, the permanent magnet film becomes thicker relative to the MR film. This results in magnetic flux leakage from portions not in contact with the MR film, and can lead to noise. The present invention provides that if the thickness of the permanent magnet film is no more than three times the thickness of the MR film, preferably 0.5–3 times, then the decrease in output is slight and almost all Barkhausen noise can be eliminated.

Also, in the prior art, a thick permanent magnet film results in a narrow playback gap, thus decreasing the distance between the permanent magnet film and the shield. This can result in an electrical short. If the permanent magnet film can be made thin enough, electrical insularity can be maintained. It is a failure of the known CoCrPt composition (the composition having a low $B_r$ of 9000 G or less from IEEE Trans. Mag., vol. 31 pp. 2612–2614), that $H_c$ decreases dramatically as the permanent magnet film is made thinner. Consequently, the properties of the permanent magnet film becomes inadequate. With the CoCrPt alloy composition of the present invention, it is possible to obtain a high coercive force $H_c$ of 700 Oe or more even when the film is thin, and a stable bias field for limiting Barkhausen noise is easily obtained.

Figure 16:
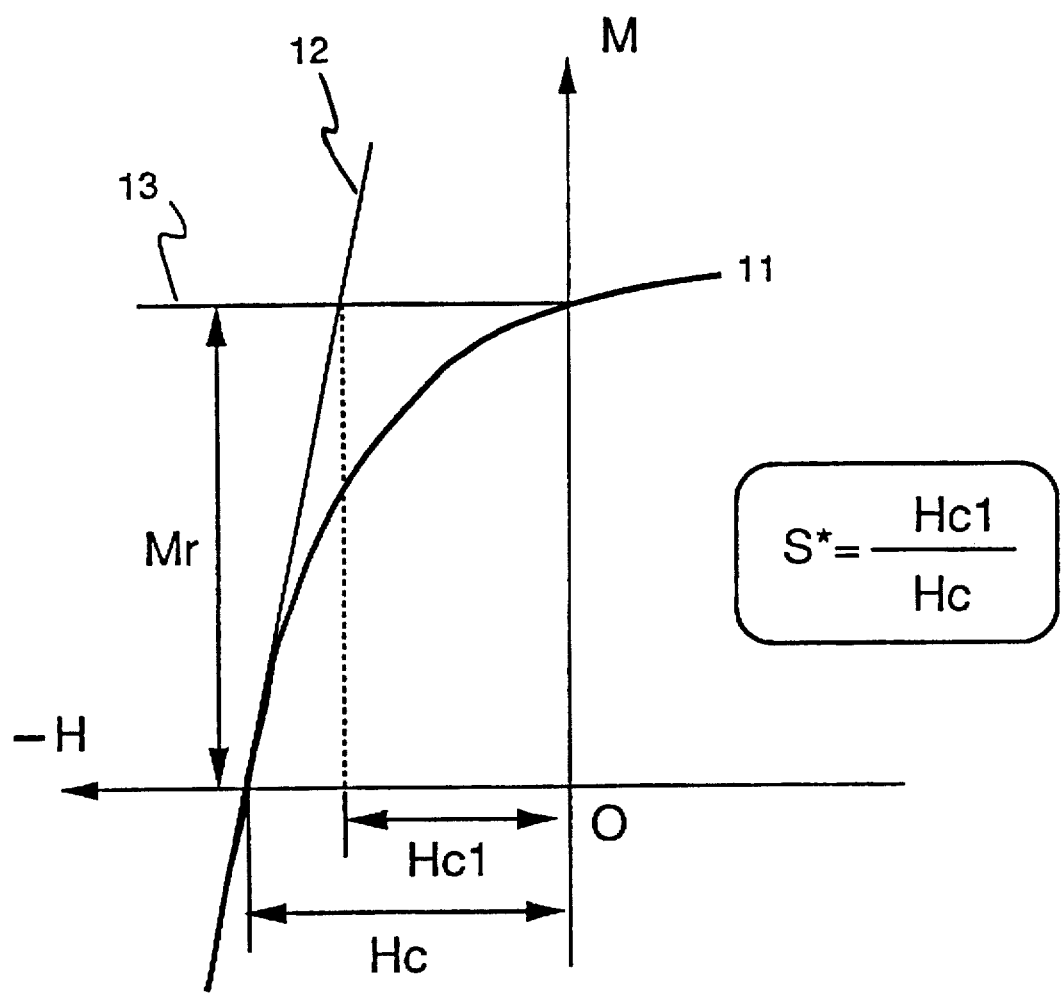
FIG. 16 is a drawing for the purpose of explaining the coercive force squareness ratio.

Besides $H_c$, the present invention provides a high coercive force squareness ratio S* that serves to limit Barkhausen noise, and provides that a range of 0.60–0.85 is preferable. Referring to FIG. 16, S* is an amount defined by $S^* = H_{c1}/H_c$. In a magnetization curve 11, $H_{c1}$ is the X component (magnetic field H) of the interval between the origin and the intersection of a tangent line 12 and a parallel line 13 passing through a residual magnetization $M_r$. S* represents the slope of the magnetization curve at the coercive force. If this S* value is large, the flux reversal is quick and occurs all at once. In a recent computer simulation (J. Appl. Phys. 63, pp. 3248–3253, 1988), it was found that flux reversal is influenced by the interaction of the flux of magnetic particles, and that when the magnetic interaction is small, S* is small and $H_c$ is large, while when the magnetic interaction is large, S* is large and $H_c$ is small. Thus, S* can effectively serve as an index to be used to evaluate the strength of magnetic interaction.

The permanent magnet film that is applying a bias field to the MR film can also be influenced by the magnetization of the MR film in return. In the case where the magnetic interaction of the permanent magnet film is high (when S* is large), if the magnetic particles from the section of the permanent magnet film closest to the MR film are magnetized in a direction different from the magnetic direction, then any magnetic particles adjacent to the magnetized permanent magnet film will also be magnetized, diluting or distorting the field of the permanent magnet film, and the magnetic field strength generated by the permanent magnet will be weakened. In the case where the magnetic interaction of the permanent magnet film is low (when S* is small), the magnetic particles adjacent to the magnetic particles of the permanent magnet film will be themselves difficult to magnetize, and the magnetic field strength generated by the permanent magnet will not be weakened. However, since S* is small in this case, the actual magnetization that takes place at the active point will be less, as in standard permanent magnet material, and an adequate magnetic field will not be applied. Thus, S* must be controlled to be within a certain range of values.

In the CoCrPt composition of the present invention, S* can be controlled using sputtering conditions, such as Ar gas pressure and bias voltage. In one example of the present invention, a magnetron sputtering device was used to control S* within the range of 0.60–0.85 by having Ar gas pressure be at least 10 mTorr and by having the bias voltage be at least –50 V. Further, Cr film, Mo film, or the like can be used as a base for the permanent magnet of the present invention. With these base films, it is possible to control $H_c$ and S* of the CoCrPt film by changing the crystal orientation or the crystal particle diameter.

The following is a detailed description of the present invention using embodiments.

Embodiment 1

A study was made of the relationships between coercive force $H_c$, film thickness, and the composition of the CoCrPt alloy, which is used as a permanent magnet film. Referring to FIG. 1, there is shown the relationship between film thickness and coercive force $H_c$ for two compositions of the present invention, Co:76, Cr:12, Pt:12, and Co:70, Cr:12, Pt:18 (atom %) alloy films. These compositions are the boundaries for the range covered by the present invention. Three other compositions are shown as comparative examples—Co:74, Cr:18, Pt:8; Co:68, Cr:18, Pt:14; and Co:66, Cr:12, Pt:22.

In the conventional compositions, coercive force decreases as the film is made thinner. However, it can be seen that for the compositions of the present invention there is a range down to about 300 Å where the compositions of the present invention demonstrates the unexpected relationship of an increasing coercive force with decreasing film thickness. It also can be seen that with the compositions of the present invention, a coercive force of 1000 Oe or more is obtained even when film thickness is 600 Å or less, values unavailable to conventional comparative examples. Further it can be seen that the coercive force remains above 1000 Oe even at film thicknesses as thin as below 100 Å.

Figure 2:
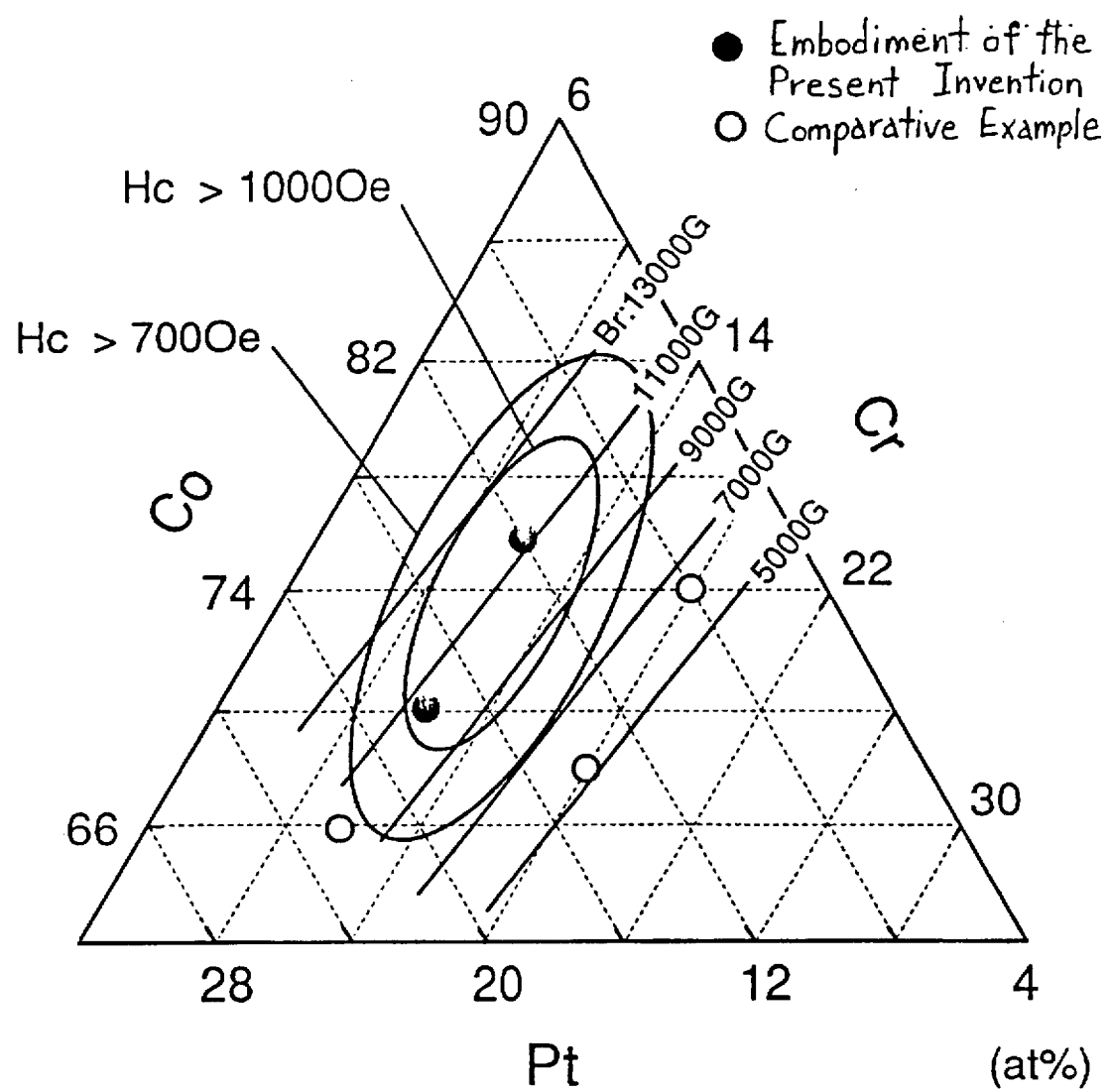
FIG. 2 is a three coordinate diagram showing the three factors relating to the permanent magnet film.

Referring to FIG. 2, there is shown how residual flux density $B_r$ and coercive force $H_c$ are dependent on the composition of the CoCrPt alloy film of the present invention. The relationship in comparative examples are also shown.

$B_r$ needs to be at least 9000 G and $H_c$ needs to be at least about 700 Oe in order to obtain the bias field necessary for limiting Barkhausen noise even when the permanent magnet film is thin. The present invention comprises a composition range for this as Co: 65–82 atom %, Cr: 10–15 atom %, and Pt: 8–20 atom %. Thus, when narrower gaps and thinner permanent magnet films are used, the CoCrPt alloys within the composition range of the present invention can provide high coercive force where conventional compositions cannot.

Figure 14:
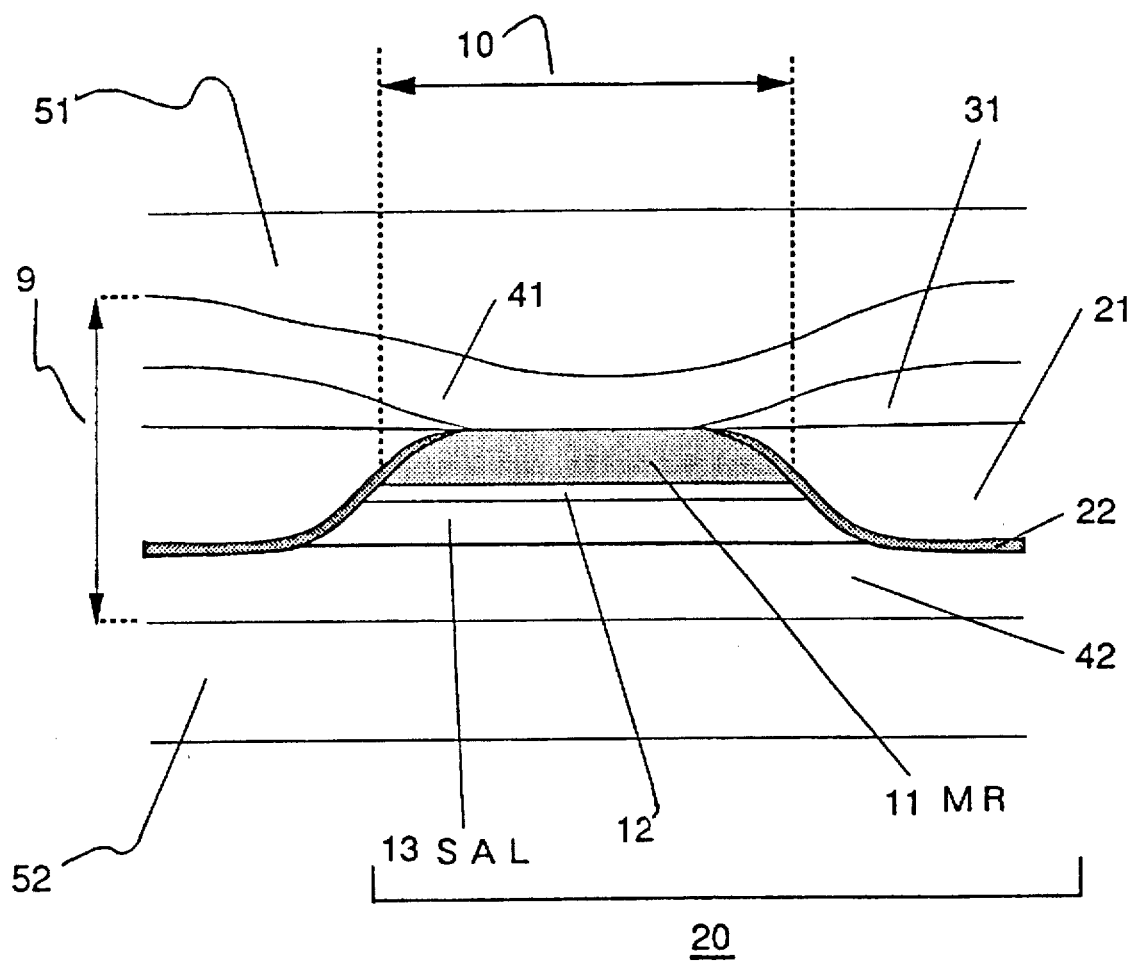
FIG. 14 is a cross-section drawing of a conventional SAL-type MR head.

Referring to FIG. 14, a structure for an MR element was constructed in the following manner to verify the effect of the permanent magnet film of the present invention. A SAL film (Ni—Fe—Cr film) 13 and a shunt film (Ta film) 12 are surrounded on either side by a base film (Cr film) 22, a permanent magnet film (CoCrPt alloy film) 21, and an MR film (Ni—Fe alloy film) 11, which are stacked on a lower shield layer (Fe—Al—Si alloy film) 52 via a lower insulating layer ($Al_2O_3$ film). On this is formed an electrode film (Ni—Fe—Ta alloy film) 31, an upper insulating film 41, and a mid-shield film 51.

The present invention provides a bias to MR film 11 using the same method as the one disclosed in Japanese laid-open publication number 3-125311. Accordingly, the magnetically sensitive region is biased with both a longitudinal bias and a transverse bias. The longitudinal bias is generated parallel to MR film 11. The transverse bias is generated by shunt film 12 and SAL film 13, which are parallel to MR film 11.

In this embodiment, the thickness of MR film 11 was varied in the range of 50–200 Angstroms, the thickness of permanent magnet film 21 was varied in the range of 25–600 Angstroms, and the thickness of shunt film 12 was set to 100 Angstroms. An Fe—Al—Si alloy was used for the lower shield layer. $Al_2O_3$ was used for the upper and lower insulating layer. A Ni—Fe—Cr alloy was used for the SAL film. Ta or Nb was used for the shunt film. Cr, W, or Mo was used for the base film. A CoCrPt alloy was used for the permanent magnet film. A Ni—Fe alloy was used for the MR film. A Ni—Fe—Ta or Mo—Au alloy was used for the electrode film. By changing the composition of the CoCrPt alloy, the residual flux density of the permanent magnet film could be controlled within the range of 5400–14000 G, and comparative studies were performed.

Coercive force $H_c$ and coercive force squareness ratio S* were changed by controlling the composition of the CoCrPt film and the thickness of the base film. An inductive head 1 formed on MR head 2 was used to record on a magnetic recording medium, and the playback properties of the MR head were studied. For this study the track width of inductive head 1 was set to 7 microns. Barkhausen noise was observed as follows. First, the recording and playback processes were repeated twenty times and the playback waveforms were observed on an oscilloscope. In this repeated measurement, the waveforms were visually observed for obvious changes in peak values, jumps in the waveform, and baseline shifts. If any of these were noticed, it was assumed that Barkhausen noise was generated by the sample head. A Barkhausen elimination ratio was defined as (the number of times Barkhausen noise was not observed) /(the number of measurements) In these cases, as described above, the number of measurements were twenty.

Figure 3:
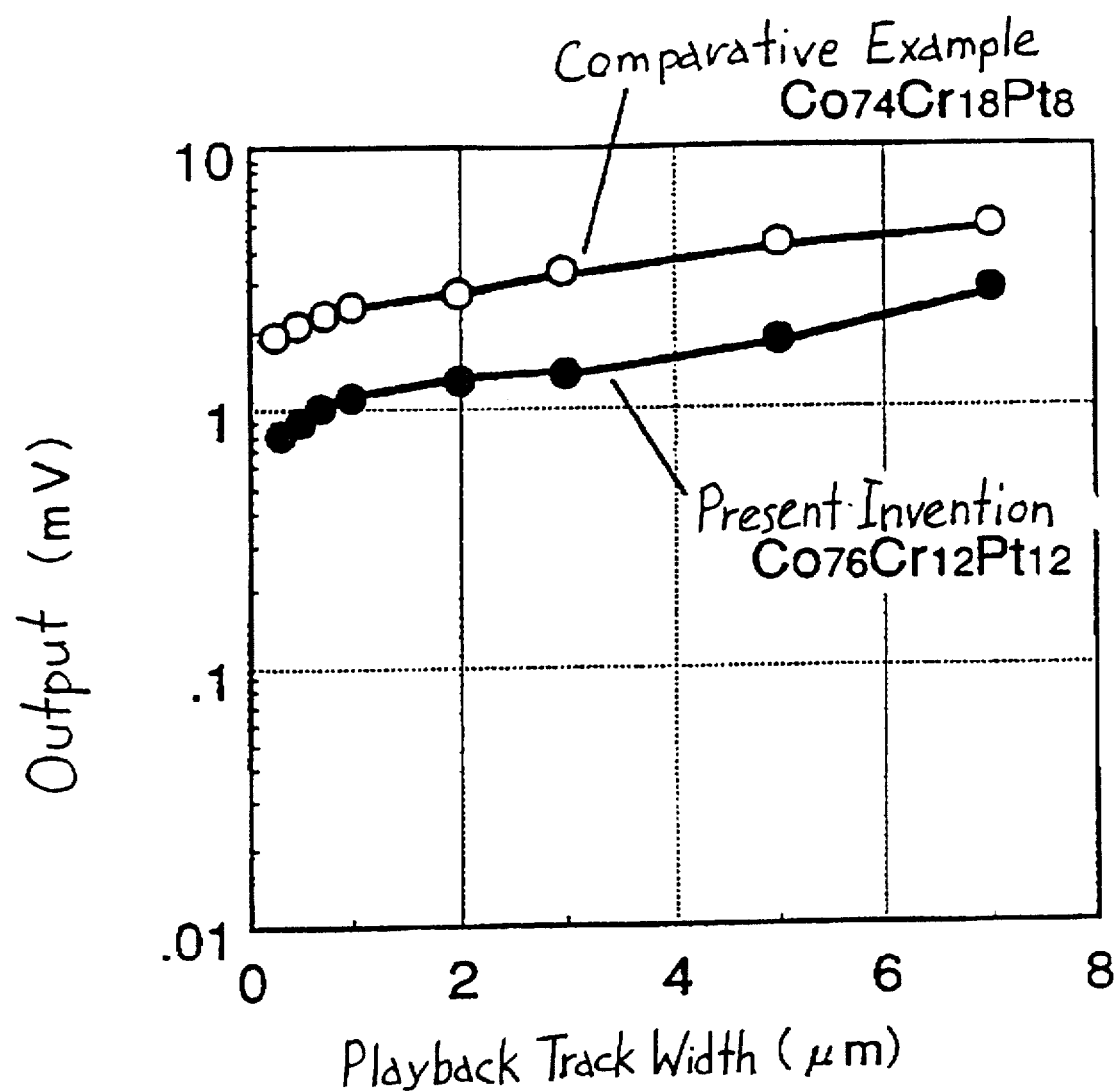
FIG. 3 shows the relationship between playback track width and output properties.
Figure 4:
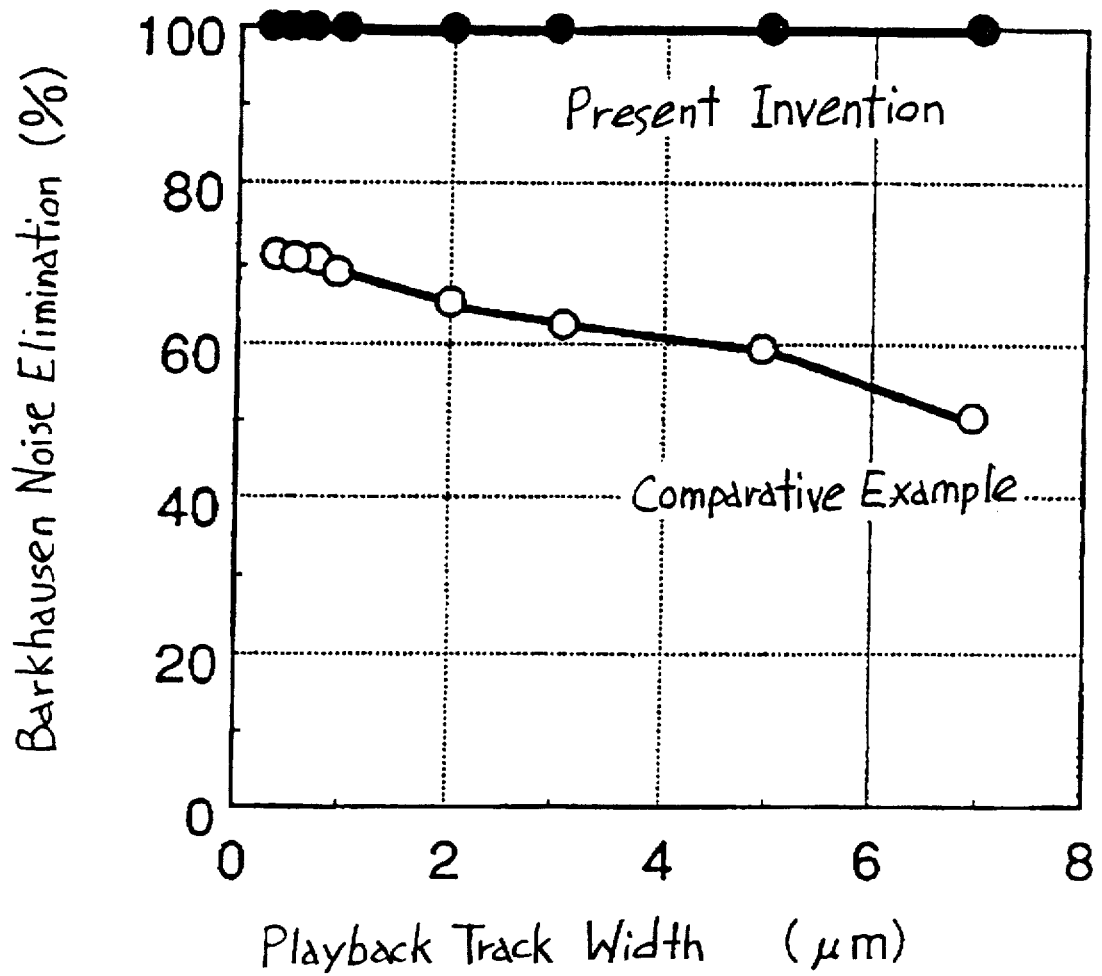
FIG. 4 shows the relationship between playback track width and Barkhausen noise.

Referring to FIG. 3 and FIG. 4, there is shown the changes in output from the SAL-type MR head and the Barkhausen noise elimination ratio for different playback track widths. In this comparative example for a permanent magnet membrane, the composition is Co:74, Cr:18, Pt:8 (atom %), with a $B_r$ of approximately 6000 G for the residual flux density. For the present invention, an alloy of Co:76, Cr:12, Pt:12 (atom %) with a $B_r$ of approximately 11000 G is used.

The output for narrower track widths and the rates of elimination of Barkhausen noise was compared. The width of the playback track was varied from 7 microns to 0.1 microns. The playback gap length was fixed at 0.2 microns. The MR membrane was set to 100 Å and the permanent magnet membrane was set to 200 Å.

Referring to FIG. 1, when the thickness of the permanent magnet membrane is 200 Å, the prior art example using Co:74, Cr:18, Pt:8 showed a coercivity $H_c$ of 600 Oe. For the present invention using Co:76, Cr:12, Pt:12, the coercivity was 1700 Oe. The product of the residual flux density and the membrane thickness (BR×t) was 120 Gmicrons and 220 Gmicrons respectively. The output from the composition of the prior art example is higher for both wider and narrower playback track widths from 7 microns to 0.1 microns. This is believed to be due to the fact that the smaller $B_r$×t of the composition of the prior art example results in a higher sensitivity.

With either composition, the output diminishes as the track width is narrowed. This is due to the fact that as the permanent magnet membranes approach each other, the magnetic field applied to the MR membrane becomes stronger and sensitivity decreases. With the thickness of the permanent magnet membrane made the same as in this embodiment, the present invention was compared to the prior art example. It was possible that a problem would arise if the sensitivity would decrease because the use of the alloy of the present invention would provide a larger $B_r$×t than the prior art example. However, even when the playback track width was narrowed to 0.1 micron, an adequate output was obtained, so this was not a problem.

The properties of the present invention are clearly seen in the elimination of Barkhausen noise. When the composition according to the present invention is used, Barkhausen noise can be completely eliminated for track widths between 7 microns and 0.1 microns. With the prior art composition, the narrower the track width is made, the rate of elimination of Barkhausen noise improves gradually, but Barkhausen noise is not adequately eliminated even at 0.1 microns. This is believed to be because with the present invention the coercivity of the permanent magnetic membrane is high, at 1700 Oe, whereas the coercivity is low, at 600 Oe, for the prior art composition.

Thus, the state of magnetization of the permanent magnet membrane is influenced in the prior art example by the magnetic field from the recording medium and the magnetic field from the MR membrane. With the prior art composition, Barkhausen noise cannot be eliminated when the permanent magnet membrane is made thin since high coercivity cannot be obtained. By using a magnetic alloy with a high $B_r$ as in the present invention, however, even a thin permanent magnet can provide an adequate output while also completely eliminating Barkhausen noise.

Embodiment 2

The SAL-type MR head indicated in Embodiment 1 was made and tests were done for different thicknesses of the permanent magnet film and of the MR film. As a result, it was found that the ratio of these thicknesses influenced the output and Barkhausen noise.

Figure 5:
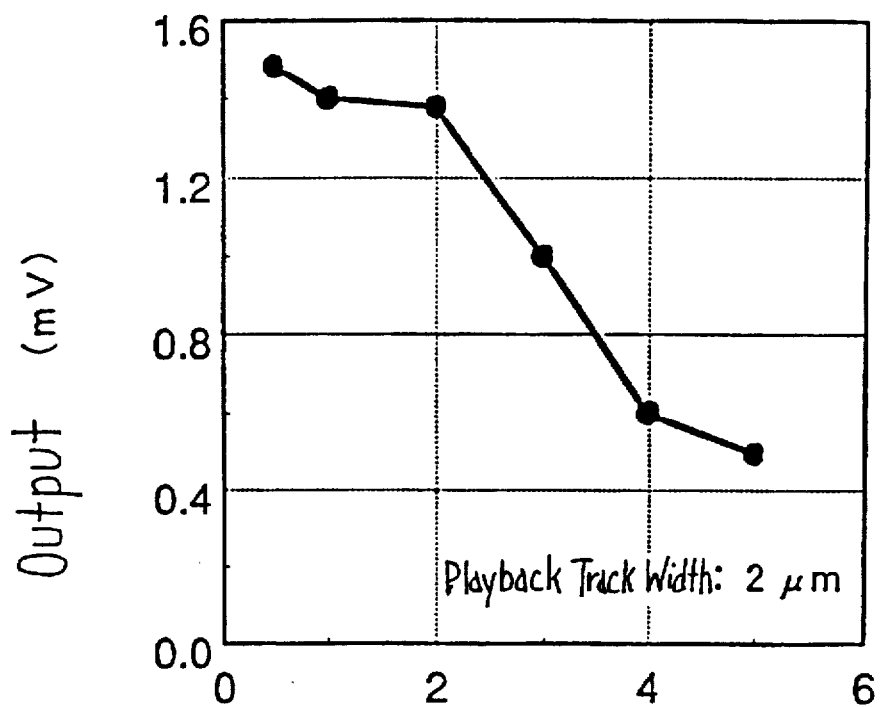
FIG. 5 shows the relationship between film thickness ratio and output properties in SAL-type MR heads.
Figure 6:
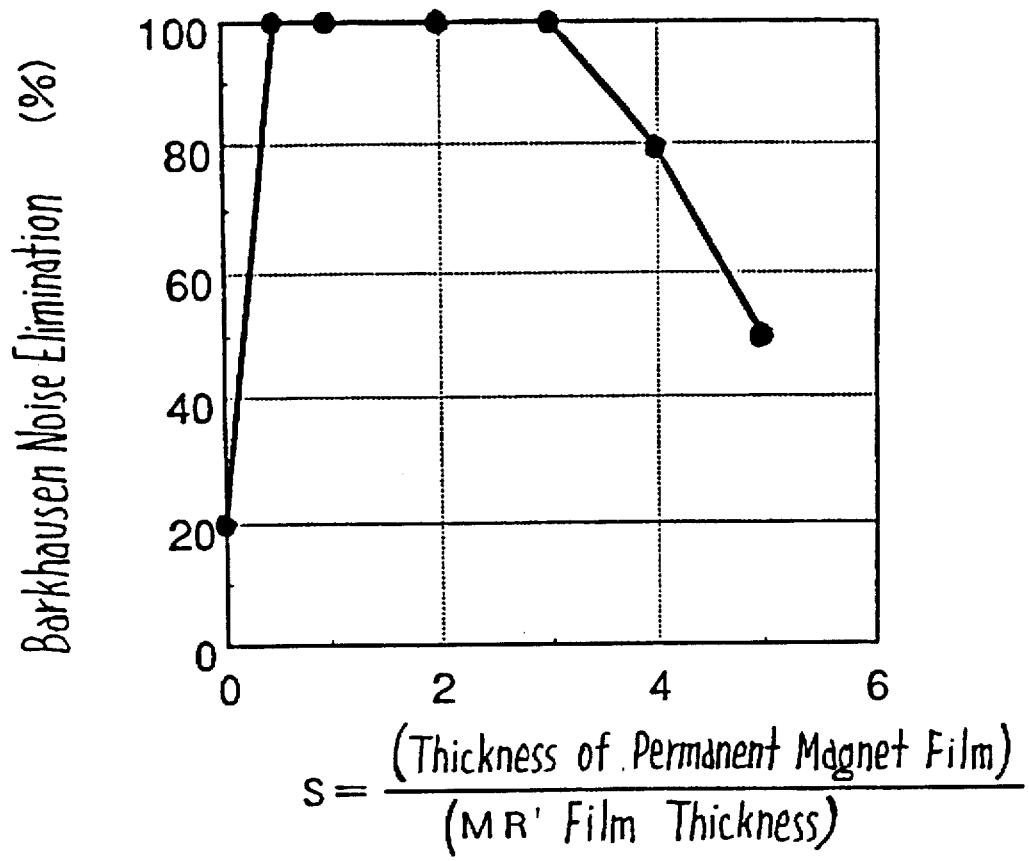
FIG. 6 shows the relationship between film thickness ratio and Barkhausen noise in spin-valve MR heads.

Referring to FIG. 5 and FIG. 6, there is shown the variation of output and Barkhausen noise elimination for different values of the ratio between the thicknesses of the permanent magnet film and the MR film (the ratio s is defined here as the thickness of the permanent magnet film/the thickness of the MR film). In these examples, the playback track width is 2 microns and the playback gap length is 0.2 microns. A Co:76, Cr:12, Pt:12 (atom %) alloy with a $B_r$ of approximately 11000 G was used for the permanent magnet film.

In the range in which Barkhausen noise is eliminated (s=0.5-3), the output decreases gradually as the ratio increases. When s is 4 or more, the output decreases dramatically and, at the same time, Barkhausen noise is generated. This is believed to be because the longitudinal bias field from the permanent magnet film was not only applied to the MR film but also leaked in the area around the MR film, thus influencing the magnetic signal from the medium. Also, when s=0, i.e. when there was no permanent magnet film, Barkhausen noise was generated frequently and a stable output could not be obtained. These results show that by setting the thickness of the permanent magnet film according to the thickness of the MR film thickness, it is possible to eliminate Barkhausen noise while also providing longitudinal bias that allows adequate output.

Embodiment 3

Figure 15:
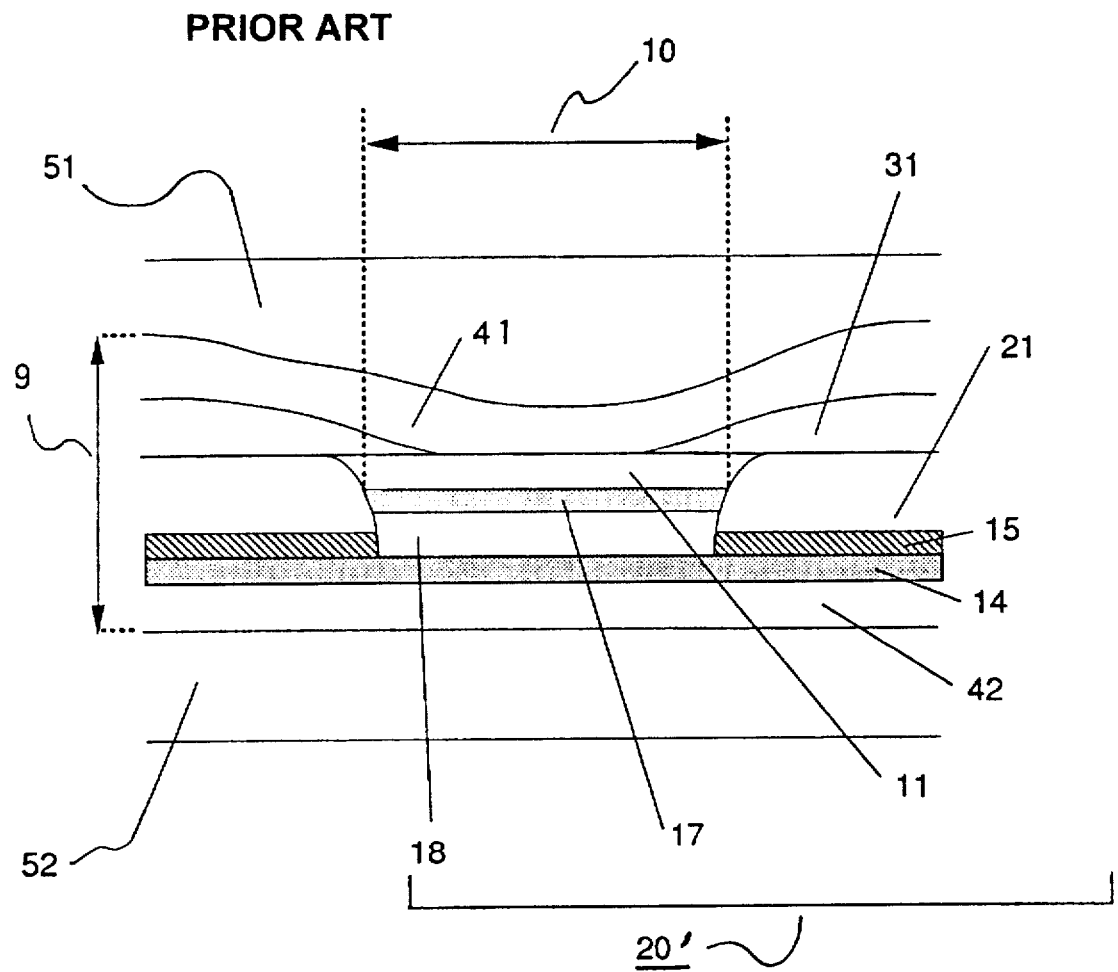
FIG. 15 is a cross-section drawing of a conventional spin-valve MR head.

Referring to FIG. 15, a spin-valve MR element was prepared. The element was combined with an inductive head. Recording and playback functions were performed as in the example above. The output and the Barkhausen noise elimination rate were studied. Also, Barkhausen noise was evaluated based on the same standards as those used in Embodiment 1.

Referring to FIG. 15, the following structure was used for the spin-valve MR head. On a lower shield layer (an Fe—Al—Si alloy film) 52 is formed a lower insulation layer ($Al_2O_3$ film) 42 on which is stacked an anti-ferromagnetic film (Fe—Mn film) 14, a base film (Cr film) 15, a fixed magnetization film (NiFe film) 13, a magnetic separation film (Cu film) 12, and a movable magnetization film (NiFe film) 11. A permanent magnet film (CoCrPt alloy film) 21 is formed on either side of this stack. An electrode film (Ni—Fe—Ta alloy film) 31 is then formed. Finally, a mid-shield film 51 is formed above an upper insulating film 41. Longitudinal bias is generated parallel to movable magnetization film 11.

In this embodiment, the thickness of the MR film (movable magnetization film 11) was set to 50 Angstroms, the thickness of permanent magnet film 21 was varied within the range 10–300 Angstroms, and magnetic separator film 12 was set to 20 Angstroms. An Fe—Al—Si alloy was used for the lower shield. $Al_2O_3$ was used for the upper and lower insulating layers. Cr or Mo was used for the base film. A CoCrPt alloy was used for the permanent magnet film. A Ni—Fe—Ta alloy was used for the electrode film.

Figure 7:
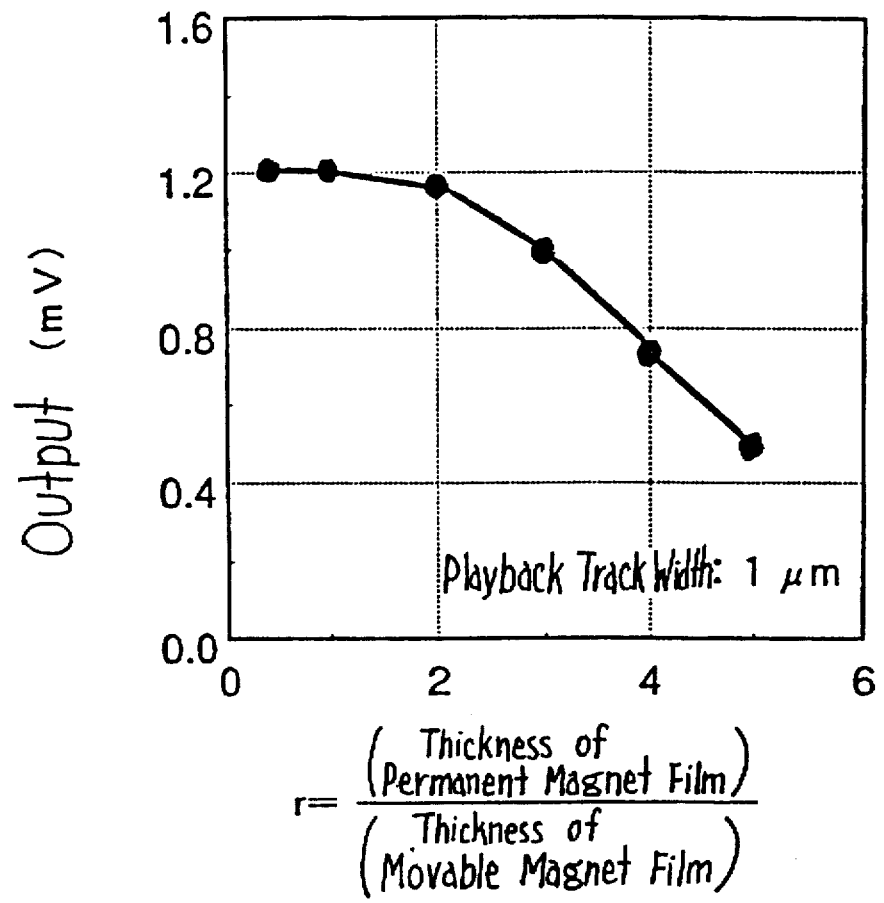
FIG. 7 shows the relationship between film thickness ratio and output properties in spin-valve MR heads.
Figure 8:
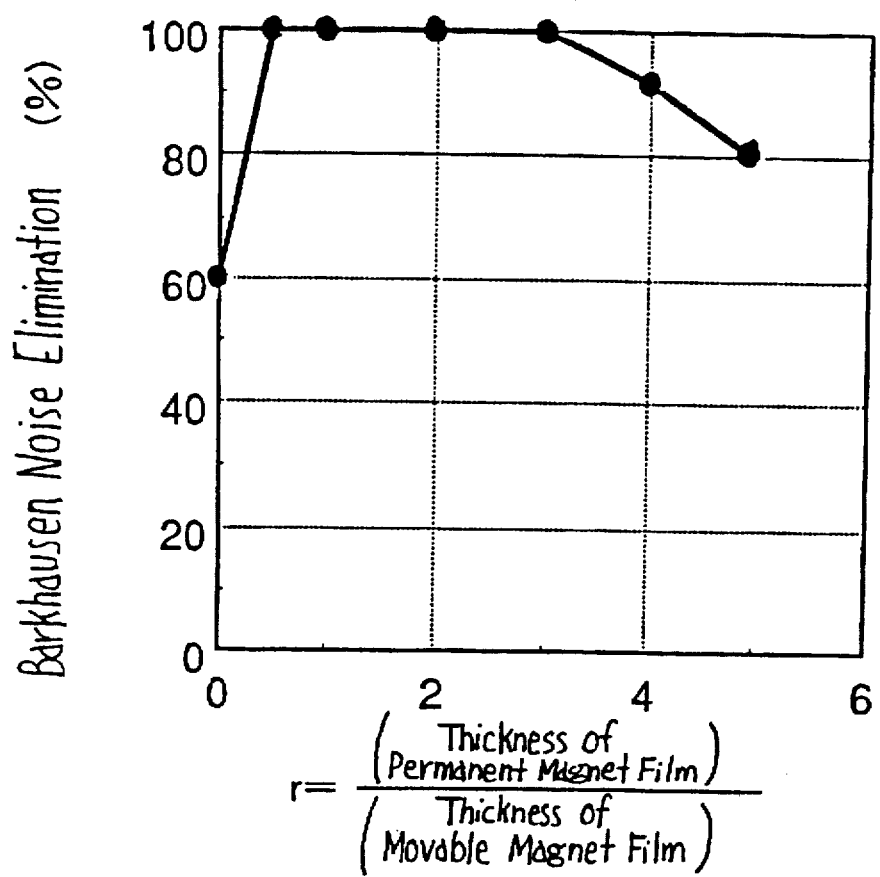
FIG. 8 shows the relationship between film thickness ratio and Barkhausen noise in spin-valve MR heads.

Referring to FIG. 7 and FIG. 8, there are shown the changes in output and Barkhausen noise elimination for different values of r, where r is the ratio of the thickness of the permanent magnet film to the thickness of the movable magnetization film. As in the SAL-type MR head, the spin-valve MR head can eliminate Barkhausen noise for r in the range of 0.5–3. The output decreases as r increases. This might be because in the spin-valve head the magnetic field from the permanent magnet film is not applied only to the movable magnetization film but also leaks to the region around the movable magnetization film, thereby influencing the signal field from the medium.

When there is no permanent magnet film as in the SAL-type MR head in Embodiment 2, Barkhausen noise frequently occurs and stable output could not be obtained. Based on these results, it was found that by setting the thickness of the permanent magnet film appropriately in relation to the thickness of the movable magnetization film, it is possible to eliminate Barkhausen noise while also providing longitudinal bias for adequate output.

Embodiment 4

A SAL-type MR head was prepared as in Embodiment 1. The product of the residual flux density and thickness, ($B_r$·t), of the permanent magnet film was studied. The permanent magnet film comprised a Co:70 atom %, Cr:14 atom %, Pt:14 atom % alloy with a $B_r$ of approximately 9000 G. The playback track width was 1.5 microns and the playback gap length was 0.2 microns.

Figure 9:
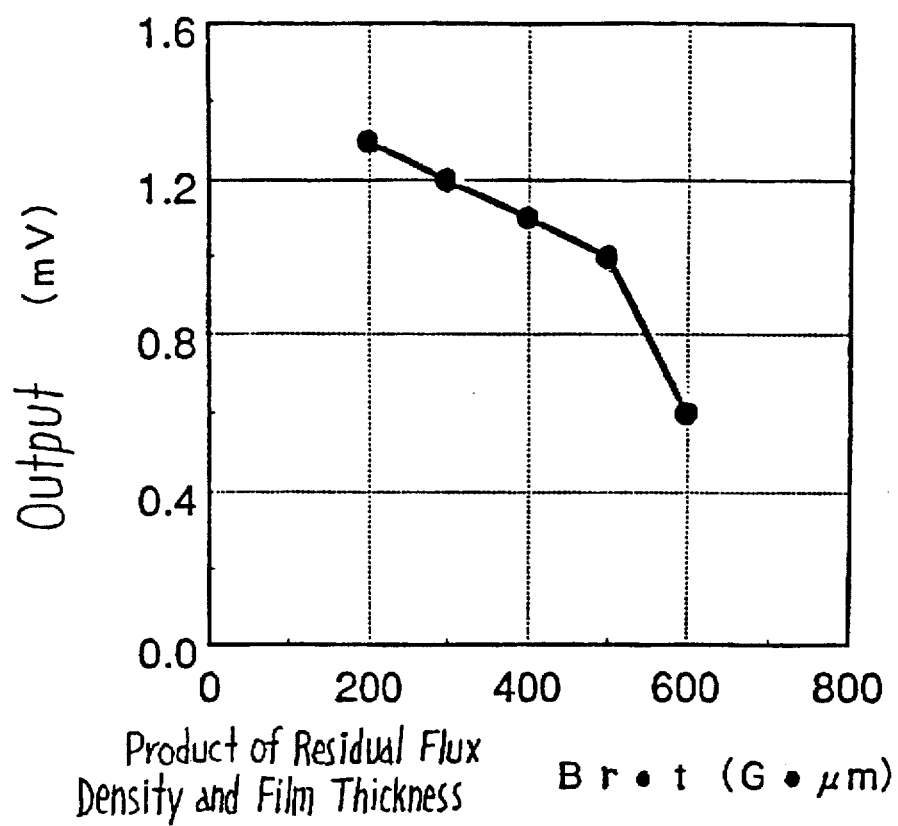
FIG. 9 shows the relationship between the ($B_r$·t) product and output properties.
Figure 10:
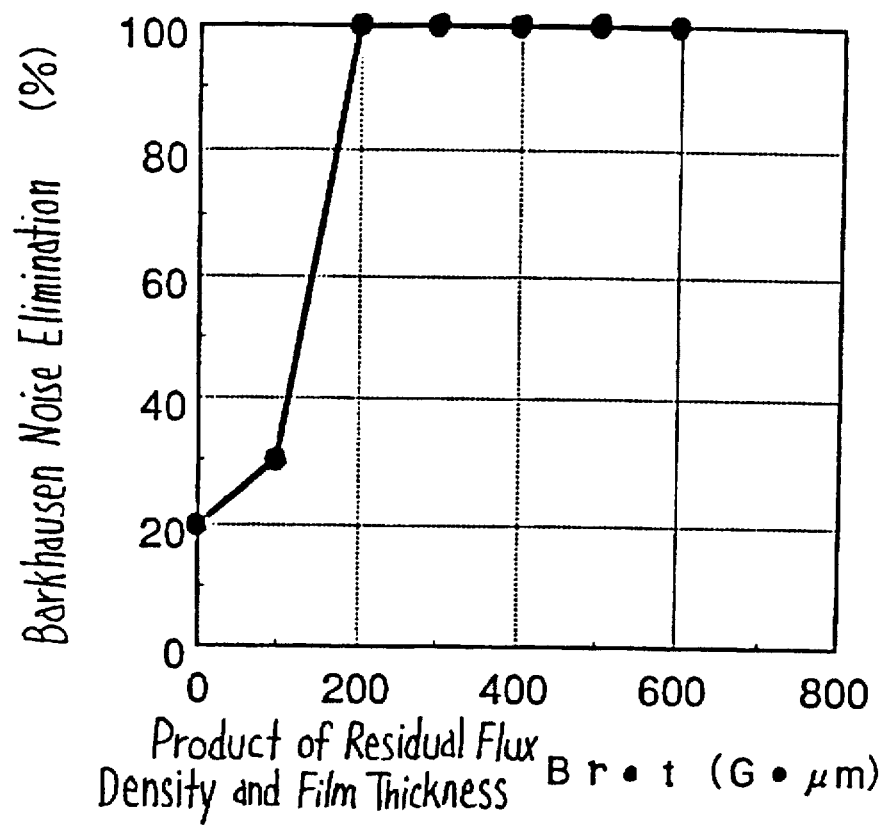
FIG. 10 shows the relationship between the ($B_r$·t) product and Barkhausen noise properties.

Referring to FIG. 9 and FIG. 10, there are shown the changes in output and Barkhausen noise elimination in relation to different values of the ($B_r$·t) product. As the ($B_r$·t) product increases, the output decreases gradually, and then decreases rapidly at 500 Gmicrons or more. It is also seen that Barkhausen noise was not found at 200 Gmicrons or higher. The results from this study indicate that a high output can be obtained and Barkhausen noise can be eliminated for a ($B_r$·t) product in the range of 200–500 Gmicrons.

Embodiment 5

A SAL-type MR head as in Embodiment 1 was prepared. A study was performed on the effect on Barkhausen noise of the coercive force $H_c$ of the permanent magnet film and the coercive force squareness ratio S*. A Co:76, Cr:12, Pt:12 (atom %) alloy having a $B_r$ of approximately 11000 G was used for the permanent magnet film. The playback track width was set to 1 micron and the playback gap length was set to 0.15 microns.

Figure 11:
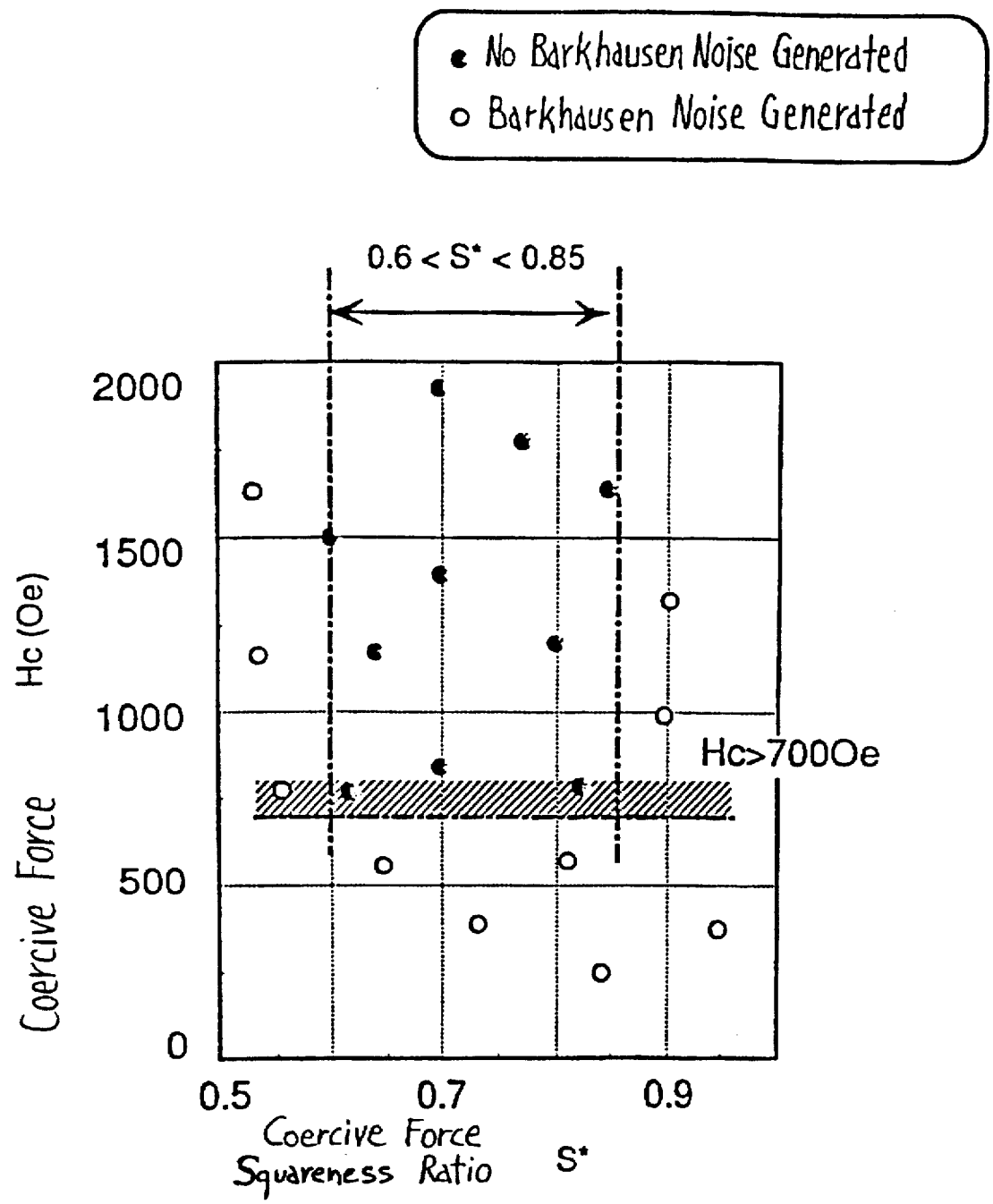
FIG. 11 is a drawing showing the distribution of coercive force and Barkhausen noise in relation to the coercive force squareness ratio.

Referring to FIG. 11, there is shown a graph indicating the $H_c$ and S* of the permanent magnet film as it relates to the presence of Barkhausen noise. It was found the Barkhausen noise is effected not only by S* but also by $H_c$. Noise is eliminated only for a value of $H_c$ of 700 Oe or more, and for the range of S* of 0.60–0.85. Barkhausen noise cannot be eliminated solely with a high Hc. An appropriate S* value must be used as well.

Embodiment 6

Figure 12:
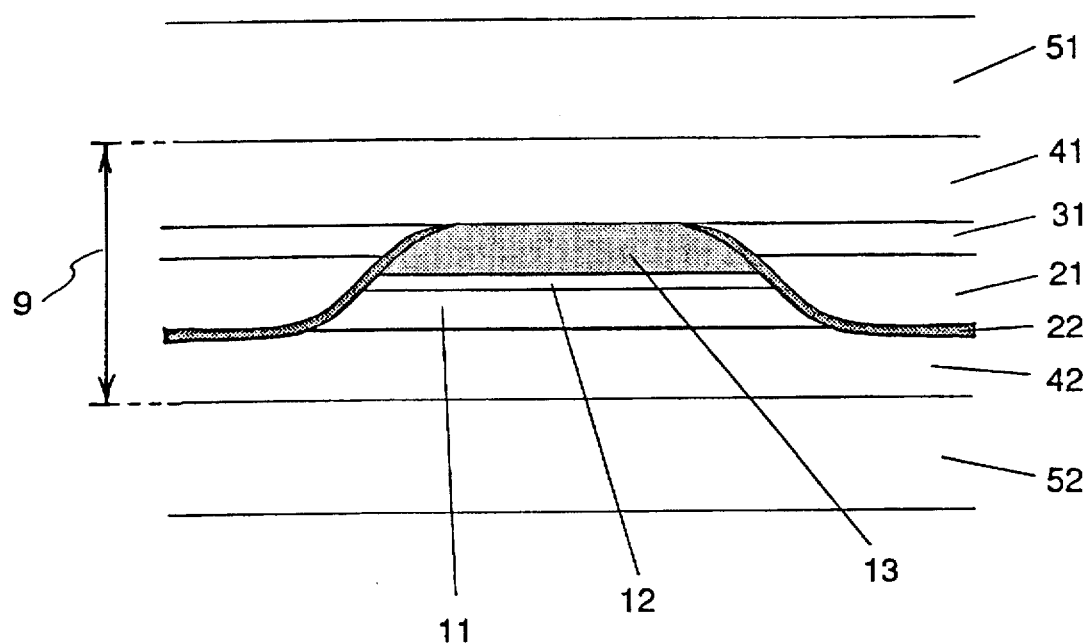
FIG. 12 is a cross-section drawing of an MR head according to an embodiment of the present invention.
Figure 13:
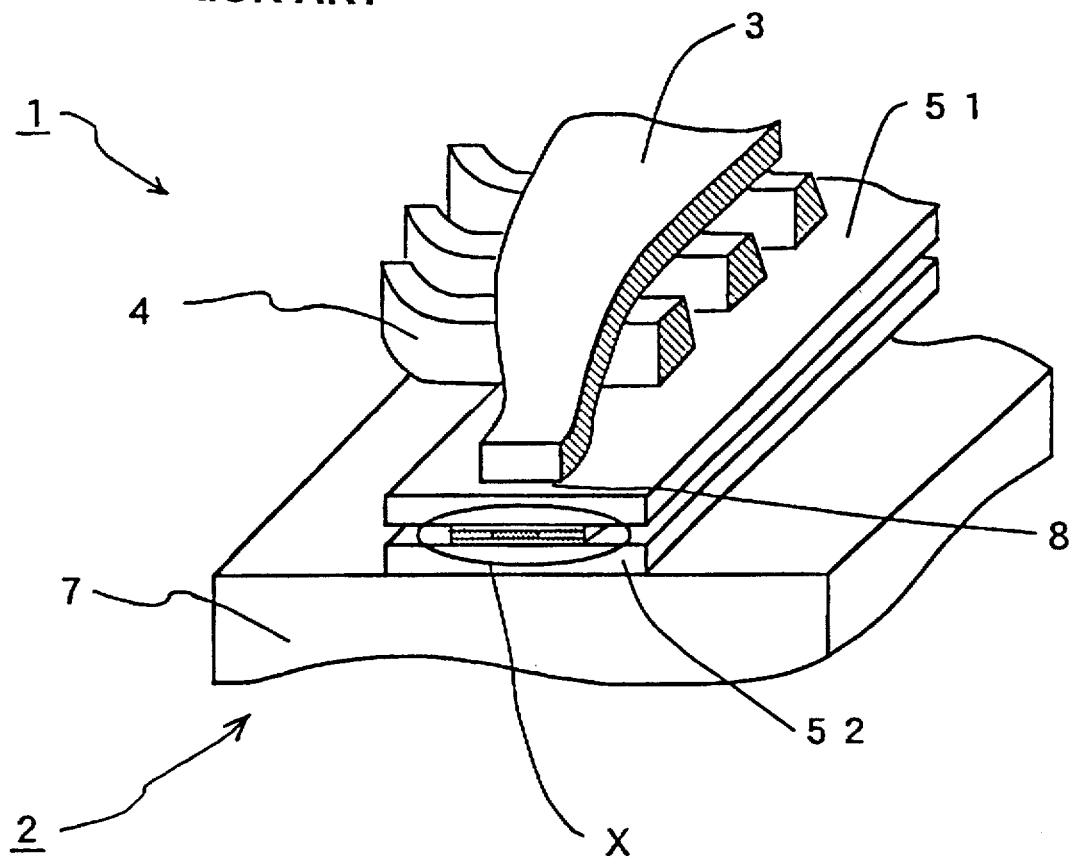
FIG. 13 is a cross-sectional perspective drawing of a conventional head with separate read and write sections.

Referring to FIG. 12, there is shown a cross-section drawing of an MR head as seen from the magnetic recording medium according to an embodiment of the present invention. In this structure, the playback gap can be made at an approximately fixed distance interval since the permanent magnet film can be made much thinner than in conventional heads. In conventional MR heads, the magnetic film are made thick so that a sufficiently large longitudinal bias field could be obtained. This thickness causes the electrode film to project into the playback gap, thereby resulting in the playback gap being forced to curve upward as shown in FIG. 14 or FIG. 15. Thus, in conventional heads, if the width of the playback track is made narrower or if the playback gap length is shortened to accommodate higher densities, the playback output would be decreased. However, in the present invention, permanent magnet film 21 can be formed at or below the level of MR film 13. Thus, an MR head for narrow tracks can be formed without making electrode film 31 thin as can be seen by comparing FIG. 12 to FIG. 14 or 15.

Thus, FIG. 12 shows that playback gap 9 of the present invention is just the thickness of upper insulating layer 41, SAL film 13, shunt film 12, MR film 11, and lower insulating film 42. In contrast, the conventional playback gap, as shown in FIG. 14 or 15, requires that playback gap 9 be thicker by the thickness of electrode film 31.

An equivalent spin-valve MR head is not shown but is similar to FIG. 12 except that the stacked stripe of the SAL-type head is replaced with that of the spin-valve MR head.

As is clear from the detailed description of the embodiments above, a SAL-type or spin-valve MR head using the bias method with a permanent magnet can eliminate Barkhausen noise and provide high sensitivity when the CoCrPt alloy of the present invention is used. This advantageous combination of absence of Barkhausen noise while maintaining high sensitivity is achieved by optimizing the thickness and the magnetic properties of the permanent magnet film through the selection of the CoCrPt alloy composition of the present invention that has a squareness ratio particularly appropriate for narrow gaps.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. This although a nail and screw may not be structural equivalents in that a nail relies entirely on friction between a wooden part and a cylindrical surface whereas a screw's helical surface positively engages the wooden part in the environment of fastening wooden parts, a nail and a screw may be equivalent structures.

What is claimed is:

1. A magnetoresistive playback head comprising:
   a magnetoresistive film having a first thickness;
   a shunt film on said magnetoresistive film, said shunt film having a second thickness;
   a soft magnetic bias film on said shunt film, said shunt film in a sandwich relationship between said magnetoresistive film and said soft magnetic bias film, said soft magnetic bias film having a third thickness;
   a stacked stripe comprising said magnetoresistive film, said shunt film, and said soft magnetic bias film, said stacked stripe having a transverse direction across said first, second, and third thicknesses, and a longitudinal direction substantially orthogonal to said transverse direction, said stacked stripe having a first end and a second end at said longitudinal direction;
   a permanent magnet film;
   an electrode film disposed on said permanent magnet film to form a bilayer stacked in said transverse direction;
   said stacked stripe is disposed with said bilayer at each of said first and second ends;
   an upper insulating layer disposed over said stacked stripe and said bilayer at each of said first and second ends;
   a lower insulating layer disposed under said stacked stripe and said bilayer at each of said first and second ends;
   a playback track region is formed by said stacked stripe disposed between said bilayer at each of said first and second ends;
   said SAL film applies a transverse bias magnetic field and said permanent magnet film applies a longitudinal bias magnetic field to said playback track region;
   said permanent magnetic film has a coercive force squareness ratio of 0.6 or higher; and
   a composite magnetic field formed from said longitudinal and said transverse bias magnetic fields from said playback track region comprises a coercive force slanted at approximately 45 degrees.

2. A magnetoresistive playback head according to claim 1 wherein:
   a thickness ratio of said magnetoresistive film to said permanent magnet film (thickness of permanent magnet film/thickness of magnetoresistive film) is within a range of 0.5–3.

3. A magnetoresistive playback head according to claim 1 wherein:
   said permanent magnet film comprises a CoCrPt alloy whose composition is Co: 65–82 atom %, Cr: 10–15 atom %, Pt: 8–20 atom %, with the total sum of the components being 100 atom %, except for unavoidable impurities.

4. A magnetoresistive playback head according to claim 1 wherein:
   a coercive force of said permanent magnet film is at least 700 Oe, and said coercive force squareness ratio is 0.6–0.85.

5. A magnetoresistive playback head according to claim 1 further comprising:
   a base film disposed at between each of said first and second ends and said bilayer, said base film extending along a surface of said bilayer at each of said first and second ends;

said base film comprising a member chosen from the group consisting of Cr, W, Mo, an alloy of Cr, an alloy of W, and an alloy of Mo; and said base film having a thickness of 50–200 Angstroms.

6. A magnetoresistive playback head according to claim 1 wherein:

said lower insulating layer and said upper insulating layer are essentially parallel within said playback track region.

7. A magnetoresistive playback head according to claim 6 wherein:

said permanent magnetic film has a fourth thickness equal to or less than that of said first thickness; and said first thickness is no more than approximately 50 Angstroms.

8. A magnetoresistive playback head according to claim 1 wherein:

said permanent magnet film has a product expressed as $(B_r \cdot t)$ wherein $B_r$ is a residual flux density and t is a film thickness of said permanent magnet film, said $(B_r \cdot t)$ having a value within the range of about 200–500 Gmicrons.

9. A magnetoresistive playback head according to claim 1 wherein said upper insulating layer has a fifth thickness and said lower insulating layer has a sixth thickness, said magnetoresistive playback head further comprising:

a playback gap consisting of a sum of said first, second, third, fifth, and sixth thicknesses.

10. A magnetoresistive playback head according to claim 9 wherein said sum is 0.4 microns or less.

11. A magnetoresistive playback head comprising:

an anti-ferromagnetic film having a first thickness, a fixed magnetizing film having a second thickness, a magnetic separation film having a third thickness, and a movable magnetizing film having a fourth thickness stacked sequentially to form a stacked stripe; said movable magnetizing film is a magnetoresistive film; said stacked stripe having a transverse direction across said first, second, third, and fourth thicknesses, and a longitudinal direction substantially orthogonal to said transverse direction, said stacked stripe having a first end and a second end at said longitudinal direction;

a permanent magnet film;

an electrode film disposed on said permanent magnet film to form a bilayer stacked in said transverse direction;

said stacked stripe is disposed with said bilayer at each of said first and second ends;

an upper insulating layer disposed over said stacked stripe and said bilayer at each of said first and second ends;

a lower insulating layer disposed under said stacked stripe and said bilayer at each of said first and second ends;

a playback track region is formed by said stacked stripe disposed between said bilayer at each of said first and second ends;

said permanent magnetic film has a coercive force squareness ratio of 0.6 or higher; and a composite magnetic field formed from a longitudinal and a transverse bias magnetic fields from said playback track region comprises a coercive force slanted at approximately 45 degrees.

12. A magnetoresistive playback head according to claim 11 wherein:

a thickness ratio of said magnetoresistive film to said permanent magnet film (thickness of permanent magnet film/thickness of magnetoresistive film) is within a range of 0.5–3.

13. A magnetoresistive playback head according to claim 11 wherein:

said permanent magnet film comprises a CoCrPt alloy whose composition is Co: 65–82 atom %, Cr: 10–15 atom %, Pt: 8–20 atom %, with the total sum of the components being 100 atom %, except for unavoidable impurities.

14. A magnetoresistive playback head according to claim 11 wherein:

a coercive force of said permanent magnet film is at least 700 Oe, and said coercive force squareness ratio is 0.6–0.85.

15. A magnetoresistive playback head according to claim 11 further comprising:

a base film disposed at between each of said first and second ends and said bilayer, said base film extending along a surface of said bilayer at each of said first and second ends;

said base film comprising a member chosen from the group consisting of Cr, W, Mo, an alloy of Cr, an alloy of W, and an alloy of Mo; and said base film having a thickness of 50–200 Angstroms.

16. A magnetoresistive playback head according to claim 11 wherein:

said lower insulating layer and said upper insulating layer are essentially parallel within said playback track region.

17. A magnetoresistive playback head according to claim 16 wherein:

said permanent magnetic film has a fifth thickness equal to or less than that of said fourth thickness; and said fourth thickness is no more than approximately 50 Angstroms.

18. A magnetoresistive playback head according to claim 11 wherein:

said permanent magnet film has a product expressed as $(B_r \cdot t)$ wherein $B_r$ is a residual flux density and t is a film thickness of said permanent magnet film, said $(B_r \cdot t)$ having a value within the range of about 200–500 Gmicrons.

19. A magnetoresistive playback head according to claim 11 wherein said upper insulating layer has a sixth thickness and said lower insulating layer has a seventh thickness, said magnetoresistive playback head further comprising:

a playback gap consisting of a sum of said first, second, third, fourth, sixth, and seventh thicknesses.

20. A magnetoresistive playback head according to claim 19 wherein said sum is 0.4 microns or less.

21. A magnetoresistive playback head according to claim 19 wherein said sum is 0.2 microns or less.

22. A magnetoresistive playback head according to claim 21 wherein said playback gap is 0.4 microns or less.

23. A magnetoresistive playback head according to claim 21 wherein said playback gap is 0.4 microns or less.

24. A magnetoresistive playback head according to claim 21 wherein said playback gap is 0.2 microns or less.

25. A magnetoresistive playback head comprising:

a magnetoresistive film having a first thickness;

a shunt film on said magnetoresistive film, said shunt film having a second thickness;

a soft magnetic bias film on said shunt film, said shunt film in a sandwich relationship between said magnetoresistive film and said soft magnetic bias film, said soft magnetic bias film having a third thickness;

a stacked stripe comprising said magnetoresistive film, said shunt film, and said soft magnetic bias film, said stacked stripe having a transverse direction across said first, second, and third thicknesses, and a longitudinal direction substantially orthogonal to said transverse direction, said stacked stripe having a first end and a second end at said longitudinal direction;

a permanent magnet film;

an electrode film disposed on said permanent magnet film to form a bilayer stacked in said transverse direction;

said stacked stripe is disposed with said bilayer at each of said first and second ends;

a base film disposed between each of said first and second ends and said bilayer, said base film extending along a surface of said bilayer at each of said first and second ends;

an upper insulating layer disposed over said stacked stripe and said bilayer at each of said first and second ends, said upper insulating layer having a fourth thickness;

a lower insulating layer disposed under said stacked stripe and said base film extending along said bilayer at each of said first and second ends, said lower insulating layer having a fifth thickness;

a playback track region is formed by said stacked stripe disposing between said bilayer; and a playback gap consisting of a sum of said first, second, third, fourth, and fifth thicknesses.

26. A magnetoresistive playback head comprising:

an anti-ferromagnetic film having a first thickness, a fixed magnetizing film having a second thickness, a magnetic separation film having a third thickness, and a movable magnetizing film having a fourth thickness stacked sequentially to form a stacked stripe; said movable magnetizing film is a magnetoresistive film; said stacked stripe having a transverse direction across said first, second, third, and fourth thicknesses, and a longitudinal direction substantially orthogonal to said transverse direction, said stacked stripe having a first end and a second end at said longitudinal direction;

a permanent magnet film;

an electrode film disposed on said permanent magnet film to form a bilayer stacked in said transverse direction;

said stacked stripe is disposed with said bilayer at each of said first and second ends;

a base film disposed between each of said first and second ends and said bilayer, said base film extending along a surface of said bilayer at each of said first and second ends;

an upper insulating layer disposed over said stacked stripe and said bilayer at each of said first and second ends, said upper insulating layer having a fifth thickness;

a lower insulating layer disposed under said stacked stripe and said base film extending along said bilayer at each of said first and second ends, said lower insulating layer having a sixth thickness;

a playback track region is formed by said stacked stripe disposing between said bilayer; and a playback gap consisting of a sum of said first, second, third, fourth, fifth, and sixth thicknesses.

* * * * *